Jan. 19, 1926.  
H. WEICHSEL  
1,570,109
ALTERNATING CURRENT MOTOR
Filed Nov. 26, 1923
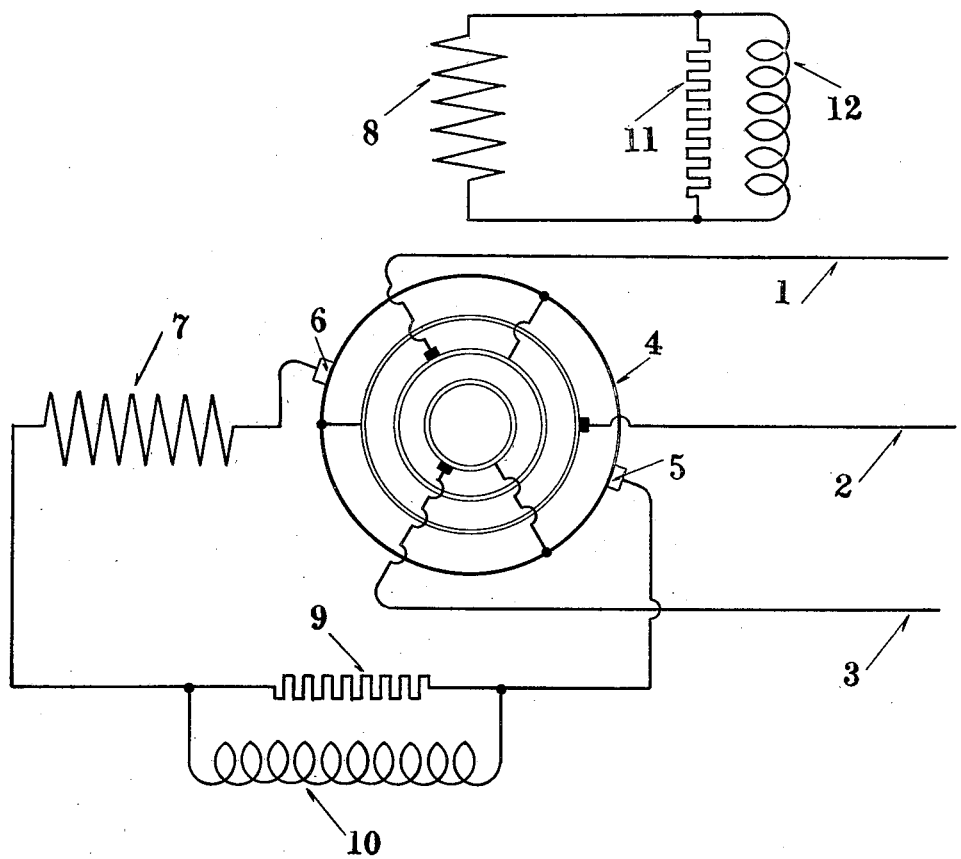
INVENTOR  
Hans Weichsel  
BY E. E. Huffman  
ATTORNEY Patented Jan. 19, 1926.

1,570,109

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed November 26, 1923. Serial No. 676,901.

*To all whom it may concern:*

Be it known that I, HANS WEICHSEL, a citizen of the United States of America, residing at the city of St. Louis, State of Missouri, United States of America, have invented a certain new and useful Alternating-Current Motor, of which the following is such a full, clear, and exact description, as will enable any one skilled in the art to which it appertains to make and use the same, reference being had to the accompanying drawings, forming part of this specification.

My invention relates to synchronous motors and its object is to provide a motor of this type which may be directly connected to the line in starting without the manipulation of starting resistances or reorganizing of circuits during the starting period or after the machine has attained synchronous speed. Speaking generally I accomplish this object by providing a combination of resistances and inductances connected in parallel in the circuits of the windings which act as starting windings and as the induced secondary windings when the machine is operating as an induction motor at speeds below synchronism.

In the accompanying drawings, which diagrammatically illustrate one embodiment of my invention in polyphase synchronous motor, the rotor is provided with a winding connected to slip-rings to which current is supplied from the mains 1, 2 and 3. The rotor winding is also connected to commutator 4 with which the brushes 5 and 6 cooperate. The stator carries winding 7 displaced from the axis of the brushes, and a winding 8 displaced by preferably 90 electrical degrees from the winding 7. The winding 7 is in circuit with the brushes and during synchronous operation of the machine furnishes the unidirectional excitation, direct current being supplied from the commutator as in a converter. Interposed in this exciting circuit is a resistance 9 and an inductance 10 connected in parallel.

During the starting period the winding 7 acts as a starting winding, as also does the winding 8. This latter winding has its terminals connected through resistance 11 and inductance 12, which elements are connected in parallel and perform similar functions to those performed by resistance 9 and inductance 10 in circuit of the winding 7. When the line current is connected to the slip-rings to start the motor, an alternating E. M. F. is induced in the windings 7 and 8, and with respect to the winding 8 an alternating E. M. F. is also conductively applied through the brushes 5 and 6. The values of the resistances 9 and 11, and of the inductances 10 and 12 are so proportioned that when alternating current is flowing in the circuits of the windings 7 and 8 the combined resistance of the inductance and resistance elements will limit the currents in these circuits to suitable values for starting purposes. As the speed of the machine increases, the frequency of the E. M. F.'s impressed on the windings 7 and 8 decreases and consequently the choking action of the inductances 10 and 12 decreases, and when synchronous speed is attained no alternating currents E. M. F. are impressed on the windings 7 and 8 and a direct current E. M. F. only is impressed on the winding 7 through the brushes 5 and 6. The ohmic resistance of the inductance 10 is smaller than that of the resistance 9 and resistance of the combination is of suitable value for the exciting circuit during synchronous operation of the machine. It will be noted therefore that the inductance automatically permits the resistance 9 to be effective during the starting operation and eliminates its effect during the running, with the result that the desired resistance conditions are attained without the manipulation of switches. In a similar manner the proportions of resistance 11 and inductance 12 are arranged to produce satisfactory current values in the winding 8 during the range of operation of the machine. As will be understood no current will be induced in the winding 8 at synchronous speed.

While I have illustrated my invention as applied to a polyphase motor, it will be understood that it is likewise applicable to single phase synchronous motors.

Having fully described my invention, what I claim as new and desire to secure by Letters Patent of the United States is:

1. In a synchronous motor, the combination of an inducing member provided with a commutator, means for supplying alternating current to said inducing member, an induced member having an exciting winding in circuit with the commutator, a resistance in said circuit, and an inductance connected in shunt with said resistance.

2. In a synchronous motor, the combination of an inducing member provided with a commutator, means for supplying alternating current to said inducing member, an induced member having an exciting winding in circuit with the commutator, a resistance in said circuit, an inductance connected in shunt with said resistance, a second winding on the induced member displaced from the exciting winding, a resistance in circuit with said winding, and an inductance in shunt with said resistance.

3. In a synchronous motor, an induced member provided with an exciting winding, means for impressing an alternating current E. M. F. on said winding at starting, means for impressing a direct current E. M. F. on said winding at synchronous speed, a resistance in circuit with said winding, and an inductance in shunt with said resistance.

In testimony whereof, I have hereunto set my hand, this 20th day of November, 1923.

HANS WEICHSEL.